(12) United States Patent
Williams

(10) Patent No.: US 8,882,891 B1
(45) Date of Patent: Nov. 11, 2014

(54) VENTED GAS DRILLING FLUID CATCH APPARATUS

(71) Applicant: Brent Williams, Geary, OK (US)

(72) Inventor: Brent Williams, Geary, OK (US)

(*) Notice: Subject to any disclaimer, the term of this patent is extended or adjusted under 35 U.S.C. 154(b) by 272 days.

(21) Appl. No.: 13/623,219

(22) Filed: Sep. 20, 2012

Related U.S. Application Data

(60) Provisional application No. 61/537,944, filed on Sep. 22, 2011.

(51) Int. Cl.
*B01D 19/00* (2006.01)

(52) U.S. Cl.
CPC .................. *B01D 19/0042* (2013.01)
USPC ............................. 95/258; 96/189

(58) Field of Classification Search
USPC ....................... 95/258, 254; 96/189
See application file for complete search history.

(56) References Cited

U.S. PATENT DOCUMENTS

| | | | | |
|---|---|---|---|---|
| 1,823,301 A * | 9/1931 | Walker | ............ | 95/260 |
| 2,057,257 A * | 10/1936 | Walker | ............ | 95/258 |
| 4,666,471 A * | 5/1987 | Cates | ............ | 95/262 |
| 2002/0017193 A1* | 2/2002 | Ramos | ............ | 95/260 |
| 2003/0205142 A1* | 11/2003 | Shah | ............ | 96/193 |
| 2005/0166759 A1* | 8/2005 | Ross et al. | ............ | 96/155 |
| 2011/0114389 A1* | 5/2011 | Mathena | ............ | 175/66 |
| 2013/0108972 A1* | 5/2013 | Stangherlin et al. | ............ | 431/202 |

FOREIGN PATENT DOCUMENTS

WO    WO2012/006685 A1 *    1/2012

* cited by examiner

*Primary Examiner* — Duane Smith
*Assistant Examiner* — Douglas Theisen
(74) *Attorney, Agent, or Firm* — Tomlinson Rust McKinstry Grable

(57) ABSTRACT

The present invention is directed to a catch tank for drilling operations. The catch tank is located between a mud-gas separator and a flare. The catch tank has an inlet port with a closed end baffle which allows a drilling fluid-gas mixture to be separated and gas to proceed to the flare without entrained drilling fluid.

2 Claims, 3 Drawing Sheets

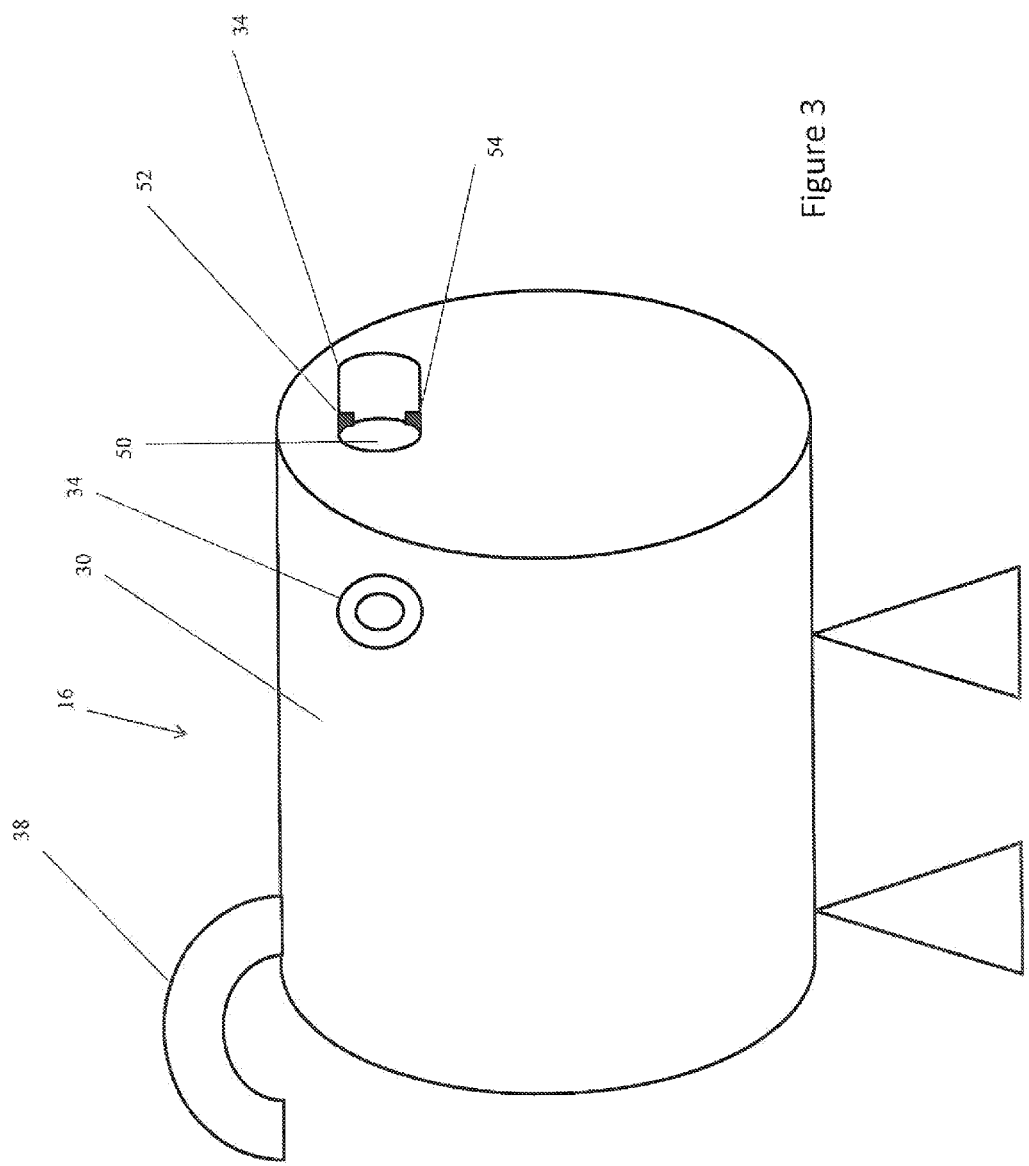

US 8,882,891 B1

VENTED GAS DRILLING FLUID CATCH APPARATUS

CROSS REFERENCE TO RELATED APPLICATION

This application claims the benefit of provisional patent application Ser. No. 61/537,944 filed on Sep. 22, 2011, the entire contents of which are incorporated herein by reference.

FIELD OF THE INVENTION

The present invention relates generally to oilfield equipment and specifically for a vented catch tank for drilling fluid overflow.

SUMMARY OF THE INVENTION

The present invention is directed to an apparatus for capturing drilling fluid. The apparatus comprises a drilling rig, a mud-gas separator located downstream from the drilling rig, a flare located downstream from the mud-gas separator, and a catch tank. The catch tank is located between the mud-gas separator and the flare. The catch tank comprises an inlet port having a closed end baffle and a mud opening such that mud entering the catch tank is directed downward by gravity and a gas line outlet in communication with the flare.

BRIEF DESCRIPTION OF THE DRAWINGS

FIG. 3 is a cutaway perspective view of a catch tank for use with the apparatus of FIG. 1.

DESCRIPTION OF THE PREFERRED EMBODIMENT

The disclosed invention is directed to an apparatus 10 designed to catch drilling fluid, or mud, often a toxic and environmentally disfavored product, which is released in the gas line of a mud-gas separator due to high pressures and other upstream conditions in a drilling rig. A catch tank is provided as an additional measure to prevent drilling fluid, which is hot, corrosive, and toxic, from exiting the apparatus through a flare. Removing drilling fluid helps prevent corrosion and blockage in the gas ignition line, and prevents drilling fluid from escaping through the flare into the environment. One skilled in the art will appreciate that hot drilling fluid poses a hazard to equipment and operators.

Figure 1:
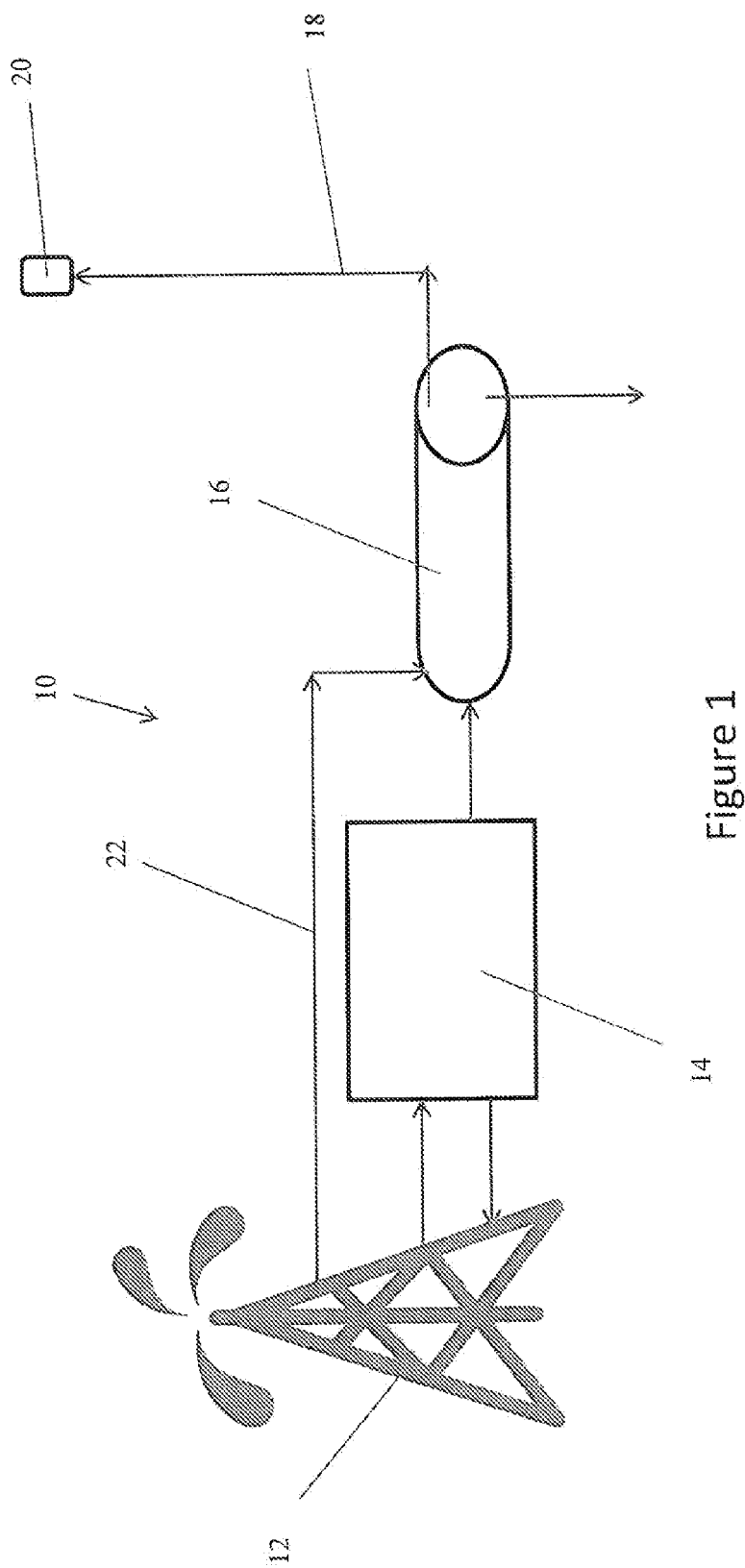
FIG. 1 is a diagrammatic representation of the apparatus of the current invention.

With reference to FIG. 1, the apparatus 10 comprises a drilling rig 12, a mud-gas separator 14, a catch tank 16, a gas ignition line 18, and a flare 20. Additionally, the apparatus 10 may comprise a panic line 22 to provide for catching drilling fluid in the case of extreme high pressure at the drilling rig 12. The drilling rig 12 produces oil and/or gas for production purposes. Drilling rigs such as drilling rig 12 use drilling fluid to promote efficient subsurface drilling. This drilling fluid returns to the drilling rig 12 with gas from the subsurface.

Ordinarily, the mixture of gas and drilling fluid from the drilling rig 12 will be separated from produced gas in the mud-gas separator 14 before excess gas is ignited at the flare 20. However, it should be understood that under high pressure, the capacity of an ordinary mud-gas separator 14 will be overcome and entrained drilling fluid will exit the mud-gas separator in the gas ignition line 18. Therefore, the catch tank 16 is located downstream from the mud-gas separator 14 but upstream from the flare 20 as an additional measure to prevent drilling fluid from exiting via the flare. The catch tank 16 catches any excess mud and separates it from the gas. The gas is allowed to enter the gas ignition line 18 and is flared at the flare 20. Drilling fluid is returned to a containment pit for processing and recycling through the apparatus 10.

A panic line 22 is coupled to the drilling rig 12 to provide pressure release in case of a "blow out". Under a "blow out" scenario, the flow rate of production at the drilling rig 12 will increase until the rig 12 cannot accommodate it, increasing pressure and putting the apparatus at risk for an explosion. The panic line 22 ordinarily allows excess gas to be vented to relieve strain on the rig 12 due to the elevated pressure. In the embodiment of FIG. 1, the panic line 22 may also couple to the catch tank 16 to prevent drilling fluid from exiting the apparatus 10 through a vent during blow out conditions.

Figure 2:
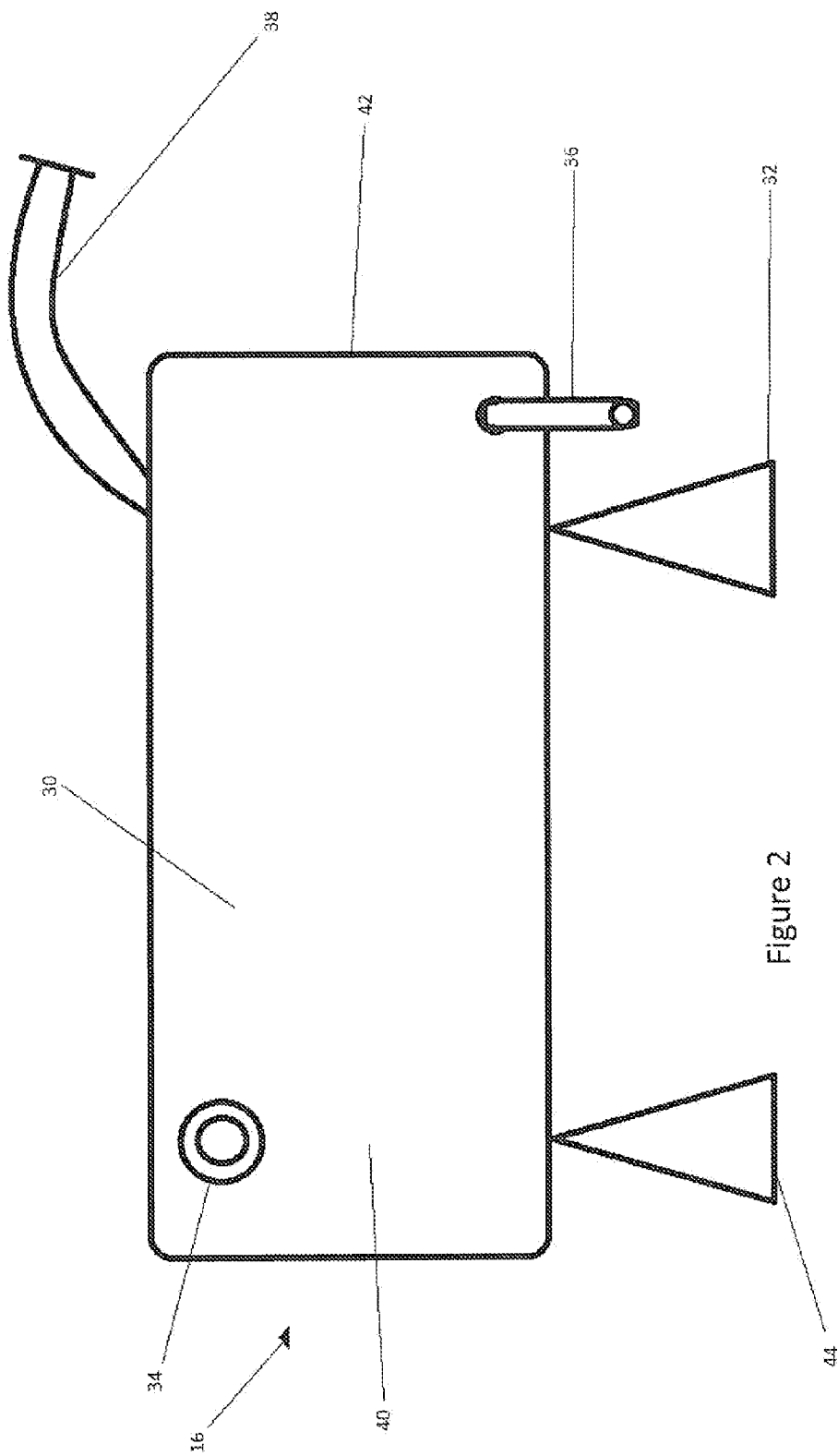
FIG. 2 is a side view of a catch tank for use with the apparatus of FIG. 1.

With reference now to FIG. 2, the catch tank 16 is shown in more detail. The catch tank 16 comprises a tank body 30, a base 32, at least one inlet port 34, a fluid line outlet 36 and a gas line outlet 38. The tank body 30 as shown in FIG. 2 is a cylinder. Alternatively, the tank body 30 may be a rectangular body or similar shape. The tank body 30 comprises a first end 40 and a second end 42 and is supported by the base 32. The base 32 may comprise skids 44 for supporting the catch tank 16 and is preferably oriented for ease of transportation to and from sites where the apparatus 10 is required via truck, train car or other common carrier.

A mud-gas mixture enters the catch tank 16 at the at least one inlet port 34 located proximate a top of the first end 40 of the tank body 30. Preferably, there are at least two inlet ports 34 located at opposing sides of the first end 40 of the tank body 30. In a preferred embodiment, the inlet ports are approximately eight inches in diameter for connection to pipes common in the oil and gas industry. However, other diameters may easily be used with the catch tank 16. The fluid line outlet 36 is located at a bottom of the tank at the second end 42 of the tank body 30 and allows drilling fluid to be removed from the catch tank 16 and processed for further use in the drilling rig 12. The drilling fluid may be removed via the fluid line outlet 36 using a fluid pump (not shown). The gas line outlet 38 is located near a top of the second end 42 of the tank body 30. Preferably, the gas line outlet 38 comprises a connection to an eight inch pipe, as is common in the industry for the gas ignition line 18. However, other diameters are anticipated by the present invention.

With reference now to FIG. 3, the catch tank 16 is shown with the inside of the tank body 30 visible. The at least one inlet port 34 comprises a closed end baffle 50, a gas opening 52 and a fluid opening 54. The gas opening 52 is located at a top end of the closed end baffle 50 while the fluid opening 54 is located at a bottom end of the closed end baffle. As shown, the catch tank 16 comprises two inlet ports 34. One skilled in the art may appreciate that one of the inlet ports 34 may receive fluids from the panic line 22 (FIG. 1) and the other from the mud-gas separator 14 (FIG. 1).

With continued reference to FIG. 3, as fluid and gas enter the catch tank 16 through the at least one inlet port 34, they contact the closed end baffle 50. Gravity causes drilling fluid to exit through the fluid opening 54. Fluid is caused to settle within the tank body 30. Gas exits the at least one inlet port 34 through both the gas opening 52 and the fluid opening 54. One skilled in the art will appreciate that the gas entering the tank body 30 at the at least one inlet port 34 will exit through the gas line outlet 38. Any drilling fluid entrained in the gas will fall out due to impact with the closed end baffle 50 and the time spent within the tank body 30 allowing the fluid to fall due to gravity.

One skilled in the art may appreciate that although the present invention has been described with respect to the preferred embodiment, various changes and modifications may be suggested to one skilled in the art, and it is intended that the present invention encompass such changes and modifications as fall within the scope of this disclosure.

What is claimed is:

1. An apparatus for capturing drilling fluid comprising:
   a drilling rig;
   a mud-gas separator located downstream from the drilling rig;
   a flare located downstream from the mud-gas separator; and
   a catch tank located between the mud-gas separator and the flare, wherein the catch tank comprises:
   an inlet port having a closed end baffle and a mud opening such that mud entering the catch tank is directed downward by gravity; and
   a gas line outlet in communication with the flare.

2. A method for preventing the escape of drilling fluid through a flare line comprising:
   receiving a gas-fluid mixture from a drilling rig at a mud-gas separator;
   separating the gas-fluid mixture into a mud stream and a gas stream;
   receiving the gas stream at a catch tank;
   removing any entrained mud from the gas in the catch tank at an inlet port having a closed end baffle and a mud opening such that mud entering the catch tank is directed downward by gravity; and
   flaring the gas.

* * * * *